: 2,904,693
Patented Sept. 15, 1959

2,904,693
METHOD FOR IDENTIFYING RUBBER

Alfred L. Miller, Cranford, N.J., Lester R. McNall, Los Angeles, Calif., and John Rehner, Jr., Westfield, N.J., assignors to Esso Research and Engineering Company, a corporation of Delaware No Drawing. Application December 20, 1956
Serial No. 629,466

4 Claims. (Cl. 250—106)

This invention relates to a method for identifying highly unsaturated rubbers from rubbers having a low degree of unsaturation by incorporating a radioactive tracer into one of said rubbers. More particularly, the invention relates to the use of radioactive zinc 65 as a means for identifying low unsaturation rubber, such as Butyl rubber, from highly unsaturated rubbers, such as GR–S rubber, Buna–N rubber, and natural rubber. The invention also encompasses a method of determining the relative amounts of low unsaturation rubber in mixtures with highly unsaturated rubbers.

In rubber plants producing products of both high and low unsaturation rubbers, it is very important to prevent the accidental mixing of these two types of rubbers since they are vulcanized differently. It is well known that it is difficult to adequately vulcanize mixtures of low unsaturation rubbers and high unsaturation rubbers when the amount of high unsaturation rubber in the blend is more than about 4% by weight. In such mixtures, during normal vulcanization, the high unsaturation rubber reacts with the curing substance at a much faster rate than the low unsaturation polymer. Thus, the latter is not cured, or, if it is allowed to cure, the former rubber is over-vulcanized. The vulcanizate which is produced by such methods generally blisters, cracks, peels and has a high porosity. If such contamination has occurred, and the degree of contamination can be determined, then special agents may be added during the vulcanization in order to obtain a properly cured product, or the contaminated stock can be worked off by further diluting the contaminant. Also, in rubber reclaiming operations, it is highly desirable to provide a quick and efficient way of segregating highly unsaturated rubber scrap stock from the low unsaturation rubber scrap in order to more efficiently process the scrap rubber and to produce uniform reclaimed rubbers. Therefore, during factory operations, it is very desirable to have a quick and reliable method of identifying high unsaturation rubber from low unsaturation rubber, and of determining whether or not contamination has occurred and the relative degree of such contamination. Such a method is provided by the present invention, wherein either the low or the high unsaturation rubber is tagged, during their manufacture, with radioactive $Zn^{65}$.

The low unsaturation rubbers referred to are those having an iodine number of about 1 to 50, as determined by the Wijs method and which includes those copolymers comprising about 85.0 to 99.5 wt. percent of a relatively low molecular weight $C_4$ to $C_7$ isoolefin and about 0.5 to 15.0 wt. percent of a $C_4$ to $C_{14}$ multiolefin. Copolymers of this type are commonly known as Butyl rubbers or GR–I rubber (Government Rubber-Isobutylene). Examples of such rubbers are copolymers of isobutylene with: isoprene, dimethyl butadiene, myrcene, piperylene, etc.

The high unsaturation rubbers are those having Wijs iodine numbers above 200, e.g. 200 to 450. Examples of such rubbers are GR–S (copolymer of butadiene and styrene); Buna–N (copolymer of butadiene and acrylonitrile) and natural rubber.

The radioactive tracer useful in the invention is zinc 65, which is ideally suitable for tagging the rubber, as it has a half-life of about 250 days; it may be used in readily detectable yet safe amounts; it forms harmless decay products; and the radiation consists of gamma and soft beta rays having very low penetrating ability. The zinc 65 is preferably used in the form of a soap of a $C_2$ to $C_{18}$ saturated fatty acid, such as $Zn^{65}$ acetate, $Zn^{65}$ butyrate, $Zn^{65}$ caprylate, $Zn^{65}$ stearate, $Zn^{65}$ palmitate, $Zn^{65}$ laurate, etc. Zinc 65 soaps of unsaturated $C_2$ to $C_{18}$ fatty acids, such as $Zn^{65}$ acrylate, $Zn^{65}$ oleate, etc. may also be used in some cases, although their use is more restricted since the unsaturation may interfere with certain rubber cures.

Since metal soaps, such as magnesium, calcium and particularly zinc soaps of $C_{14}$ to $C_{18}$ high molecular fatty acids are quite often included in compounded rubber stocks in amounts of 0.1 to 10.0 wt. percent, e.g. 0.2 to 2.0 wt. percent, the $Zn^{65}$ soap of the invention may be readily blended into the non-radioactive metal soaps which can be used. The presence of the radioactive zinc soap will not interfere with vulcanization or adversely affect the finished product. Since the zinc soaps are rubber soluble, an even distribution of the radioactive material in the rubber is obtained, thereby assuring an accurate means of identification.

The $Zn^{65}$ soap may be blended with non-radioactive metal soap (e.g. zinc stearate), so as to give a material having a radiation intensity of about $6 \times 10^{-5}$ to $6 \times 10^{-1}$, preferably $6 \times 10^{-5}$ to $6 \times 10^{-3}$, microcuries per gram. At these levels of radioactivity, the zinc 65 containing soap is harmless. This blend may be added to either the high or low unsatuarted rubber during any stage of manufacture, whether preparation of the raw rubber, or in compounding of the rubber. Frequently a metal soap is added during the processing of the raw rubber while it is in a slurry state, where it acts as a lubricant and prevents sticking of the rubber particles to the equipment during further processing. In this event, the zinc 65 containing soap of the invention may be advantageously used as the lubricant.

The presence and intensity of the radioactive zinc 65 in the rubber is readily determined by means of Geiger counters, proportional counters, scintillation detectors, etc.

By knowing the initial level of radioactivity of the tagged rubber stock, and by determining the present intensity of radiation of a mixed rubber stock, it is possible to also approximate the relative amounts of the tagged rubber in mixtures of tagged and untagged rubbers.

The invention will be further understood by the following examples, which include the preferred embodiments of the invention.

EXAMPLE I

One phr. of a zinc stearate blend consisting of non-radioactive zinc stearate and radioactive zinc 65 stearate, said blend having a radiation level of $8.4 \times 10^{-3}$ microcuries per gram of zinc stearate, was milled into a fully compounded Butyl rubber (GR–I–25) carcass stock. The carcass stock had a Mooney viscosity at 212° F. (8 minutes) of about 41 to 49, a tensile strength after a 40-minute cure at 307° F. of about 2300 p.s.i., and was prepared from the following recipe:

| Ingredients | Parts by weight |
|---|---|
| Butyl rubber | 100 |
| Carbon black, SRF | 50 |
| Mineral oil [1] | 15 |
| Amberol ST–137X [2] | 2 |
| Zinc oxide | 5 |
| Sulfur | 2 |
| Tellurium diethyl dithiocarbamate | 1 |

[1] The oil has a viscosity at 210° F. of 58, an API gravity of 25.6 and a pour point of −10° F.
[2] Resinous dimethylol phenol (non-reactive).

EXAMPLE II

This example was similar to Example I, except that 3.0 phr. of the radioactive zinc stearate blend was milled into the Butyl rubber carcass stock.

EXAMPLE III

A blend was prepared by milling 25 wt. percent of the product of Example I and 75 wt. percent of a fully compounded natural rubber-GR–S–1500 (75 wt. percent butadiene-25 wt. percent styrene) stock which had the following recipe:

| Ingredients: | Parts by weight |
|---|---|
| GR–S | 67 |
| Smoked sheet | 33 |
| Phenyl beta naphthylamine | 1 |
| Carbon black, SRF | 35 |
| Carbon black, EPC | 10 |
| Mineral oil [1] | 10 |
| Zinc oxide | 5 |
| Sulfur | 3 |
| Benzothiazyldisulfide | 1 |

[1] The oil had a viscosity at 210° F. of 58, an API gravity of 25.6 and a pour point of −10° F.

EXAMPLE IV

A blend similar to that of Example III was prepared, except that the GR–S stock was blended with the product of Example II.

The radiation of the products of the above examples was detected by means of a scintillation counter employing a sodium iodide crystal. The counts from this detector were recorded through the use of an Utting SG1A scaler.

The following table shows the radiation of each of Examples I to IV, their composition and the composition of the mixed rubbers of Examples III and IV as indicated by their radiation:

*Table I*

| Ex. No. | Rubber Stock Composition | Concentration of Zinc Stearate Blend, phr.[1] | Corrected,[2] Counts/min. | Indicated Rubber Composition |
|---|---|---|---|---|
|  | 100% Natural Rubber-GR-S stock. | None | 0 |  |
| I | 100% Butyl carcass stock | 1 | 38 |  |
| II | ----do---- | 3 | 98 |  |
| III | 75 wt. percent natural Rubber-GR-S stock, 25 wt. percent of the product of Example I. | 0.25 | 7 | 81 GR–S, 19 Butyl. |
| IV | 75 wt. percent natural Rubber-GR-S stock, 25 wt. percent of the product of Example II. | 0.75 | 33 | 66% GR–S, 34% Butyl. |

[1] Parts per 100 parts of rubber.
[2] The background count has been subtracted from the count measured for each sample to give a corrected count.

The above table shows that it is possible (a) to identify the presence of Butyl rubber in the presence of any other rubber when the Butyl is labeled with a radioactive material such as $Zn^{65}$ stearate; (b) to make a practical estimate of the amount of Butyl rubber in the mixture; and (c) to use a labeling material commonly used in rubber technology and at a level of radioactivity completely harmless to human beings.

What is claimed is:

1. A method for identifying rubbers which comprises incorporating into the rubber to be identified a radioactively detachable amount of a zinc 65 soap of a $C_2$ to $C_{18}$ fatty acid.

2. A method for identifying low unsaturated rubber from high unsaturated rubber, which comprises incorporating into one of said rubbers about 0.1 to 10.0 wt. percent of a metal soap of a $C_2$ to $C_{18}$ saturated fatty acid, a portion of said metal being $Zn^{65}$ in an amount such that the radiation range of the soap is about $6 \times 10^{-5}$ to $6 \times 10^{-1}$ microcuries per gram of soap.

3. A method according to claim 2, wherein said metal soap is zinc stearate.

4. A method according to claim 3, wherein said zinc stearate is incorporated into the low unsaturated rubber and wherein said low unsaturated rubber is a compolymer of a $C_4$ to $C_7$ isoolefin and a $C_4$ to $C_{14}$ multiolefin.

References Cited in the file of this patent

UNITED STATES PATENTS

| 2,365,553 | Hill | Dec. 19, 1944 |
| 2,378,328 | Robinson et al. | June 12, 1945 |
| 2,680,900 | Linderman | June 15, 1954 |

OTHER REFERENCES

Radioactive Isotopes as Tracers, by A. W. Kramer, from Power Plant Engineering, November 1947, pages 105–108.

UNITED STATES PATENT OFFICE

CERTIFICATE OF CORRECTION

Patent No. 2,904,693 September 15, 1959

Alfred L. Miller et al.

It is hereby certified that error appears in the printed specification of the above numbered patent requiring correction and that the said Letters Patent should read as corrected below.

Column 4, line 12, for "detachable" read -- detectable --.

Signed and sealed this 15th day of March 1960.

(SEAL)
Attest:

KARL H. AXLINE
Attesting Officer

ROBERT C. WATSON
Commissioner of Patents